US 6,314,919 B1

(12) United States Patent
Pugachev

(10) Patent No.: US 6,314,919 B1
(45) Date of Patent: Nov. 13, 2001

(54) METHOD FOR PREPARING AN AIR-FUEL MIXTURE FOR AN INTERNAL COMBUSTION ENGINE, DEVICE FOR REALIZING THE SAME AND HEAT-EXCHANGER

(76) Inventor: Alexandr Vasillevich Pugachev, ul. D.Davydova, d.3, kv. 101, Moscow (RU), 121170

( * ) Notice: Subject to any disclaimer, the term of this patent is extended or adjusted under 35 U.S.C. 154(b) by 0 days.

(21) Appl. No.: 09/424,389
(22) PCT Filed: Mar. 22, 1999
(86) PCT No.: PCT/RU99/00087
    § 371 Date: Nov. 23, 1999
    § 102(e) Date: Nov. 23, 1999
(87) PCT Pub. No.: WO98/49204
    PCT Pub. Date: Sep. 30, 1999

(30) Foreign Application Priority Data

Mar. 26, 1998 (RU) .................................................. 98106739
Feb. 16, 1999 (RU) .................................................. 99103475

(51) Int. Cl.⁷ .................................................. F02B 43/08
(52) U.S. Cl. .................................................. 123/3
(58) Field of Search .............................. 123/3, 545, 546, 123/547, 549, 553

(56) References Cited

U.S. PATENT DOCUMENTS

| 3,901,197 | 8/1975 | Noguchi et al. . | |
| 4,019,476 | 4/1977 | Ackley . | |
| 4,147,142 | 4/1979 | Little et al. . | |
| 4,303,051 | * 12/1981 | Weishaar | 123/3 |
| 4,384,611 | 5/1983 | Fung . | |
| 4,403,576 | * 9/1983 | Dimitroff et al. | 123/3 |

(List continued on next page.)

FOREIGN PATENT DOCUMENTS

| 24 08 462 | 8/1975 | (DE) . |
| 26 13 348 | 7/1980 | (DE) . |
| 36 07 007 | 9/1987 | (DE) . |
| 1 484 662 | 9/1977 | (GB) . |
| 493073 | 3/1976 | (RU) . |

(List continued on next page.)

Primary Examiner—Willis R. Wolfe
Assistant Examiner—Benton Jason

(57) ABSTRACT

The present invention pertains to the field of engine construction and may be used in the inlet systems of internal combustion engines for processing a portion of the rich air-fuel mixture fed into the main flow, wherein the liquid fuel is pulverised and converted into gas. The purpose of this invention is to increase fuel savings, to reduce the exhaust gas toxicity and to enable the use of a cheaper low-octane fuel. The method for preparing the air-fuel mixture comprises using the heat from the hot gases produced for heating the excessively rich mixture flow that contains between 10 and 100% of petrol to be used by the engine, wherein said heating is carried out before mixing the mixture with the second flow. The mixture is then submitted in one or more steps to the thermal action of activators with compensation for the air used during the reactions. The device of the present invention comprises a heat exchanger (1) as well as a unit for dosing the mixture components (2), wherein said unit is connected by an inlet duct (5) to the mixture circuit through which said mixture is fed into a chamber (3) with an activator (4). The hot gases are generated in this chamber and flow through the inlet duct (6) of the gas circuit as well as through the outlet duct (7) thereof into the engine inlet system. The activator (4) chamber is connected to a pipe (8) and to a plurality of nozzles (9) for supplying additional air to the activator. The heat exchanger includes a body having an embossed partition therein that defines a plurality of cells-channels for the flow of the heat-carrier and the heating medium, wherein the walls of each cell-channel are connected together at their end portion up to half the height of the channel.

5 Claims, 3 Drawing Sheets

U.S. PATENT DOCUMENTS

| | | | |
|---|---|---|---|
| 4,475,483 | * 10/1984 | Robinson | 123/3 |
| 4,588,659 | * 5/1986 | Abens et al. | 123/3 |
| 4,625,681 | * 12/1986 | Sutekiyo | 123/3 |
| 4,716,859 | * 1/1988 | Konig et al. | 123/3 |
| 4,735,186 | * 4/1988 | Parsons | 123/3 |
| 4,862,836 | * 9/1989 | Chen et al. | 123/3 |
| 4,884,531 | * 12/1989 | Degnan, Jr. et al. | 123/3 |
| 4,926,830 | * 5/1990 | McNelley | 123/549 |
| 5,007,381 | * 4/1991 | Kakegawa et al. | 123/3 |
| 5,092,304 | * 3/1992 | McNelley | 123/549 |
| 5,293,857 | * 3/1994 | Meyer | 123/3 |
| 5,299,536 | * 4/1994 | Moard et al. | 123/3 |
| 5,327,874 | 7/1994 | Pugachev et al. . | |
| 5,373,825 | * 12/1994 | Stephens et al. | 123/549 |
| 5,410,990 | * 5/1995 | Firey | 123/3 |
| 5,746,188 | * 5/1998 | Cooke | 123/3 |

FOREIGN PATENT DOCUMENTS

| | | |
|---|---|---|
| 661227 | 5/1979 | (RU) . |
| 2008494 | 2/1994 | (RU) . |
| 2008495 | 2/1994 | (RU) . |
| 2076232 | 3/1997 | (RU) . |

* cited by examiner

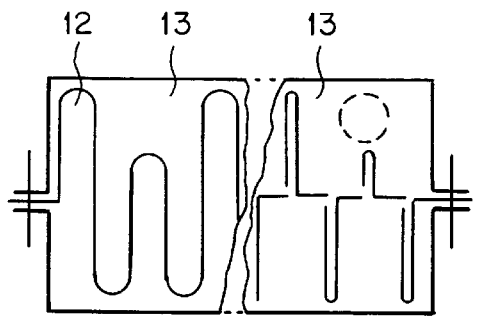
FIG. 4A
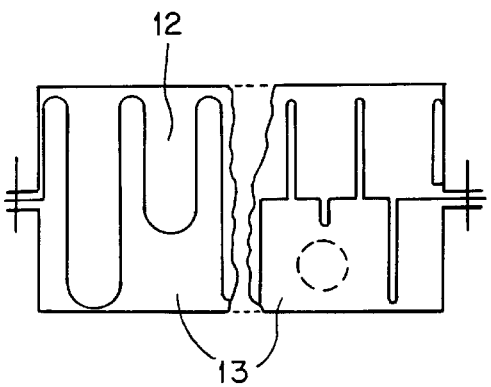
FIG. 4B
FIG. 5A
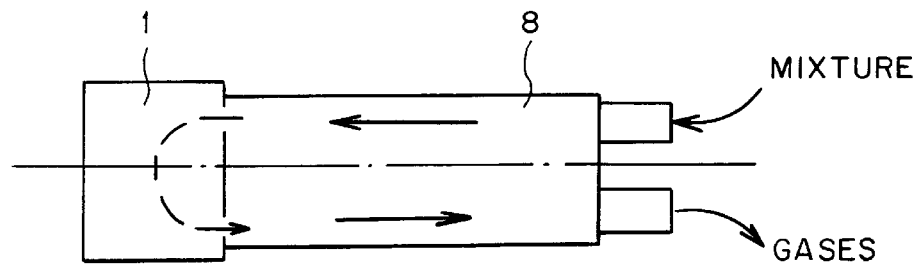
FIG. 5B
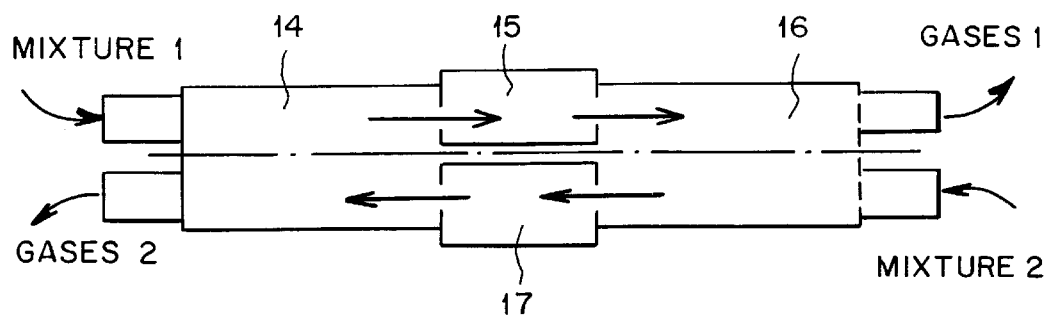

METHOD FOR PREPARING AN AIR-FUEL MIXTURE FOR AN INTERNAL COMBUSTION ENGINE, DEVICE FOR REALIZING THE SAME AND HEAT-EXCHANGER

TECHNICAL FIELD

The present invention relates in general to mechanical engineering, more specifically to engine-building industry and can find application in fuel systems of internal combustion engines.

BACKGROUND ART

At present routine methods for preparing fuel-air mixture for internal combustion engines consists in producing a hydrogen-containing gas from liquid fuel and adding said gas to the fuel-air mixture.

However, the liquid fuel decomposing reaction according to the heretofore-known methods occurs in the presence of highly expensive platinum-based catalysts at rather high temperatures (cf. U.S. Pat. No. 4,147,142). The catalysts need regular replacement in the course of operation. Presence of antiknocking additives are detrimental to catalysts. And use of only the heat of exhaust gases for fuel decomposition is inadequate to attain an efficient and stable running of the fuel decomposition process.

Therefore higher temperature of the fuel-air mixture is attained by burning part of the fuel, thus increasing its consumption (cf. U.S. Pat. No. 3,901,197). Then the thus-preheated mixture is fed to the catalytic chamber and whence to the internal combustion engine. However, use of an open fire is hazardous under conditions of an internal combustion engine. A danger of flame travel and an outbreak of fire arises when engine runs unsteadily or misses, as the velocity of flame travel in the fuel-air mixture may exceed the flow velocity of the mixture itself.

Moreover, unburnt hydrocarbons of the CnHn+2 type are left after burning an enriched mixture, which are deposited in the catalyst pores as soot and coke, thus putting the catalyst out of order. On the other hand, the use of only the heat of ICE exhaust gases for fuel decomposition is inadequate to attain an efficient and stable running of the fuel decomposition process.

Therefore a higher temperature of the mixture is attained by burning part of the fuel, thus adding to its consumption (U.S. Pat. No. 3,901,197). Then the thus preheated mixture is fed first to the catalytic chamber, then to the engine.

However, use of an open fire in an internal combustion engine is hazardous. A danger of flame travel and an outbreak of fire arises when an engine runs unsteadily or misses, as the velocity of flame travel in the fuel-air mixture may exceed the flow velocity of the mixture itself.

As an enriched mixture cannot be burnt completely, it comprises unburnt hydrocarbons of the CnHn+2 type which are deposited in the catalyst pores as soot and coke, thus putting the catalyst out of order.

DE Pat. A1 #3,607,007 provides for heating one of the mixture flows on a hot blind end of a special piping, which is of low efficiency due to a steam-and-gas cushion forming on said end face, as well as a considerable aerodynamic drag offered to the running flow of mixture. Furthermore, the fuel decomposition reaction runs as an endothermic one and at a high temperature which is not provided by the method in question, whereas use of exhaust gases having a temperature of 750° C. in the area of the valve seat is impossible as said temperature drops abruptly in the direction away from said are towards the end face of the piping being heated.

One prior-art device for preparing fuel-air mixture is known to comprise an additional heating arrangement with an ignition spark and a burner to which the fuel-air mixture is fed and burns therein in an open fire, after which said mixture is fed to the reactor with a catalyst, wherein part of the liquid fuel molecules get decomposed (DE B2 2,613,348).

However, the use of an open fire and of expensive and short-lived catalysts, as well as diseconomy of said methods and devices render their application in the engine-building industry inefficient.

As regards heat-exchangers used particularly in the engine-building industry, they should meet the requirements as to minimizing aerodynamic drag or loss of head of running flows. Such requirements is of special importance for devices for heat-exchanging between low-pressure or vacuumized gas flows.

Known in the art are devices for heat exchange between exhaust gases of an internal combustion engine and fuel-air mixture, as well as devices for liquid-gas fuel conversion directly on a vehicle (FRG Pat. #3,607,007, USSR Inventor's Certificate #493,073, Russian Federation Pat. #2,008,495).

Liquid-fuel converting systems operate in internal combustion engines concurrently with the existing routine fuel-air preparing systems featuring low aerodynamic drag. Hence when said drag in the conversion system increases considerably, efficiency of the system is very low.

Closest to the method proposed herein is the one known from Pat. #2,008,494 of the Russian Federation, consisting in that two flows of fuel-air mixture are established and get overrich, one of which is heated with exhaust gases and then further heated by being passed through a promoter preheated to a temperature above the mixture ignition point, whereupon fuel thermal cracking is effected in the boundary layer of said activator by many-times repeated bringing said layer in contact with the activator surface.

The closest to the proposed device is the one according to Pat. #2,008,495 of the Russian Federation, comprising a double-loop heat-exchanger having an inlet and an outlet piping, a first loop of the heat-exchanger being a gas one, and a second loop of said heat-exchanger comprises a mixer-proportioner of the components of the mixture being handled and a mixing connector, an incandescent element provided at the heat-exchanger outlet, and an exhaust pipe of the engine, while the inlet and outlet pipes of the heat-exchanger gas loop are connected to the engine exhaust pipe and to the atmosphere, respectively, the proportioner mixing pipe communicates, via a control member, with the heat-exchanger mixing loop, while the incandescent member is of the nonigniting type and appears as a promoter having a well-developed heatable surface and located in the outlet pipe of the heat-exchanger mixture loop.

Closest to the heat-exchanger proposed herein is the one as per FRG Application #2,408,462, IPC F 28 D 9/00, wherein used as a heat-exchanging element is a corrugated plate isolating the flows of the matter being handled from one another. The corrugations define alternating cells or flow passages for the heat transfer agent and the substance being preheated to run therealong.

However, said flows of the matter are fed and withdrawn by being twice turned through 90 degrees both at the heat-exchanger inlet and outlet, thus adding much to the aerodynamic drag and increasing local head loss Hll:

$$H_{ll}=E \cdot V_2/2g,$$

where E is the drag coefficient (1.129) at the flow turn through 90 deg.;

V is the flow velocity; and g is gravitational acceleration.

With the four times repeated turn of one flow, E=1.625.

To overcome said aerodynamic drag requires an additional amount of energy which involves, under conditions of a vehicle, higher fuel consumption and affects adversely the efficiency of the fuel conversion system. Such a construction arrangement of input/output devices renders the heat-exchanger bulky, whereby it cannot always be arranged on a vehicle.

Use of construction members adding to the heat-exchange surface area in heat-exchangers for fuel conversion systems is also restricted as increasing the aerodynamic drag. As a rule, heat-exchangers of such systems operates at a low rarefaction (or pressure) thereinside (0.2–0.8 kPa) which in turn imposes its own construction requirements on the heat-exchanger components. Thus, for instance, the shell and corrugations of a heat-exchanger may be made of metal sheets 0.2–0.3 mm thick which simplifies production techniques, improves heat-transfer conditions, and reduces thermal lag of the heat-exchanger.

DISCLOSURE OF THE INVENTION

The present invention has for its principal object to add to the production efficiency and economy of hydrogen-containing gases in order to increase their share in the fuel-air mixture fed to the engine, to simplify the construction arrangement of the device carrying out the herein-proposed method and to avoid its rigid and bulky binding together with the output portion of a particular engine, as well as to attain higher operating efficiency and economy of the heat-exchanger, including its operation in fuel conversion systems of transport vehicles.

The proposed method consists in that there are formed two flows of the fuel-air mixture one of which is overrich below the ignition range, preheated to obtain carbon monoxide and hydrogen-containing gases, and mixed with the other flow of said fuel-air mixture before being fed to the internal combustion engine, wherein according to the invention, the flow of overrich fuel-air mixture containing from 10 to 100% of the amount of fuel consumed by the internal combustion engine is subjected to a single- or multistage thermal action exerted by activators arranged successively along the direction of the flow, and the air consumed for reactions is compensated for partially or completely by adding more air to the flow being handle after each stage of the activator heating.

Further increase in efficiency and economy of the proposed method is attained due to the fact that the fuel-air mixture is preheated by the heat of hot oil gases.

Moreover, said hot gases are cooled without making resort to special additional procedures which otherwise should be carried out for fear of their possible self-igniting upon having been mixed with the other flow of the fuel-air mixture in the internal combustion engine manifold.

Enhanced characteristics of the proposed device are attained due to the fact that the device for preparing the fuel-air mixture, comprising a double-loop heat-exchanger having an inlet piping and an outlet piping, a proportioner of the components of the mixture being handled, a chamber with a non-igniting incandescence element appearing as a promoter with a well-developed heatable surface area, according to the invention, the inlet of the mixer-handling loop communicates with the proportioner of the mixture components and with the promoter chamber, and the inlet and outlet pipings of the heat-exchanger gas-handling loop are connected to the promoter chamber and to the fuel-air mixture duct of the engine, respectively, whereas the promoter chamber communicates with the air duct and air nozzles downstream of the promoter.

A more efficient operation of the device is attained due to the fact that the promoter is of the multi-stage design and appears as a number of consecutively arranged sections and the air nozzles are so positioned as to feed air to the mixture flow being handled after each of the promoter stage.

Enhanced characteristics of the heat-exchanger are attained due to the fact that the heat-exchanger comprising a shell accommodating a corrugated partition defining slit-shaped cells-ducts for the heat transfer agent and the fluid being heated to run therealong is so configured that the end faces of each cell in the top portion of a corrugation are joined together air-tightly as far as half the cell longer side, thus causing the flows entering or leaving the heat-exchanger to run along the axis of the slit-shaped cells-ducts.

The proposed construction arrangement of the heat-exchanger makes it possible to do away with devices causing the mixture flows to repeatedly turn through 90 degrees.

The proposed method is based on the concept that an overrich mixture having an excess air coefficient below 0.4 is incapable of igniting; that part of the molecules of the hydrocarbon fuel component get partially oxidized after having been brought in contact with the preheated surface of the promoter or with the boundary layer thereof; that the fuel becomes decomposed most completely after its having interacted repeatedly with the promoter or with a number of its stages arranged in succession (or else with a number of promoters).

The process runs under oxidant deficiency conditions and results in decomposition of the organic fuel ($C_8H_{18}$) molecules. The separated molecules of C and H are combined with oxygen, that is, the partial oxidation reaction proceeds as follows:

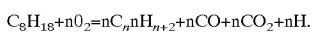

$$C_8H_{18}+nO_2=nC_nnH_{n+2}+nCO+nCO_2+nH.$$

The original molecule turns into a lighter structure, whereupon gaseous CO and H2 are disengaged Thus, an endothermic decomposition reaction occurs. Exhaust gases and water may participate in the thermal decomposition process. However, when the amount of oxidant is inadequate for carbon oxidizing to CO (with $\alpha<\alpha_{CO}$), soot-bearing (disperse) carbon starts releasing. Since air oxygen is continuously consumed in the mixture being handled, its amount is recommended to be replenished without increasing the excess air coefficient, whereby the running of the above process proceeding in the promoter zone can be prolonged so as not only to obtain more hydrogen-containing gases but also additional amount of heat disengaged in oxidation reactions. To this end air is added to the fuel-air mixture involved past the promoter. When using a promoter having a number of stages arranged in succession along the direction of running of the mixture flow, air is added after each promoter stage.

After having been treated with the promoter, the fuel-air mixture contains the following high-octane oil gases: $CH_4$, $C_2H_6$, $C_3H_8$, and $C_{14}H_{10}$, as well as CO and $H_2$. Thus, the fuel be handled turns into a lighter gaseous phase.

The aforementioned oil gases feature high octane number (125), whereas the presence of hydrogen in the fuel-air mixture extends its ignition range. This in turn allows of leaning the mixture and to burn the entire amount of fuel fed to the internal combustion engine. As far as new engines are concerned, use of such high-octane oil gases increases compression ratio, thus enhancing their technical and performance characteristics. Using the proposed method for preparing fuel-air mixture, one can run a motor vehicle on both high- and low-octane fuel. Furthermore, the content of toxic gases of exhaust gases is reduced, use of antiknocking fuel additives is dispensed with, and the operating temperatures of an internal combustion engine are decreased.

To promote understanding of the present invention given below are some specific exemplary embodiments thereof to be read with reference to the accompanying drawings, wherein:

FIG. 1 is a schematic functional diagram of the device for carrying out the proposed method;

FIG. 2 illustrates variants of a heat-exchanger element:
A—with a solid-design (welded) shell;
B—with a sectional/nonsectional shell;
C—elements of a cell-duct defined by the corrugated partition.

FIG. 3 illustrates the end portions of the heat-exchanger cells-ducts:
A—joined-together (compressed) portions of the walls of the cells-ducts (front view);
B—same (plan view);
C—same (side view).

FIG. 4 illustrates shortened cells-ducts and auxiliary spaces:
A—equal-width cells;
B—different-width cells.

FIG. 5 illustrates connection of heat-exchangers to the reactor (promoter) chamber:
A—single (as along the flow) heat-exchanger;
B—two serially connected heat-exchanger elements.

BEST METHOD OF CARRYING OUT THE INVENTION

Figure 1:
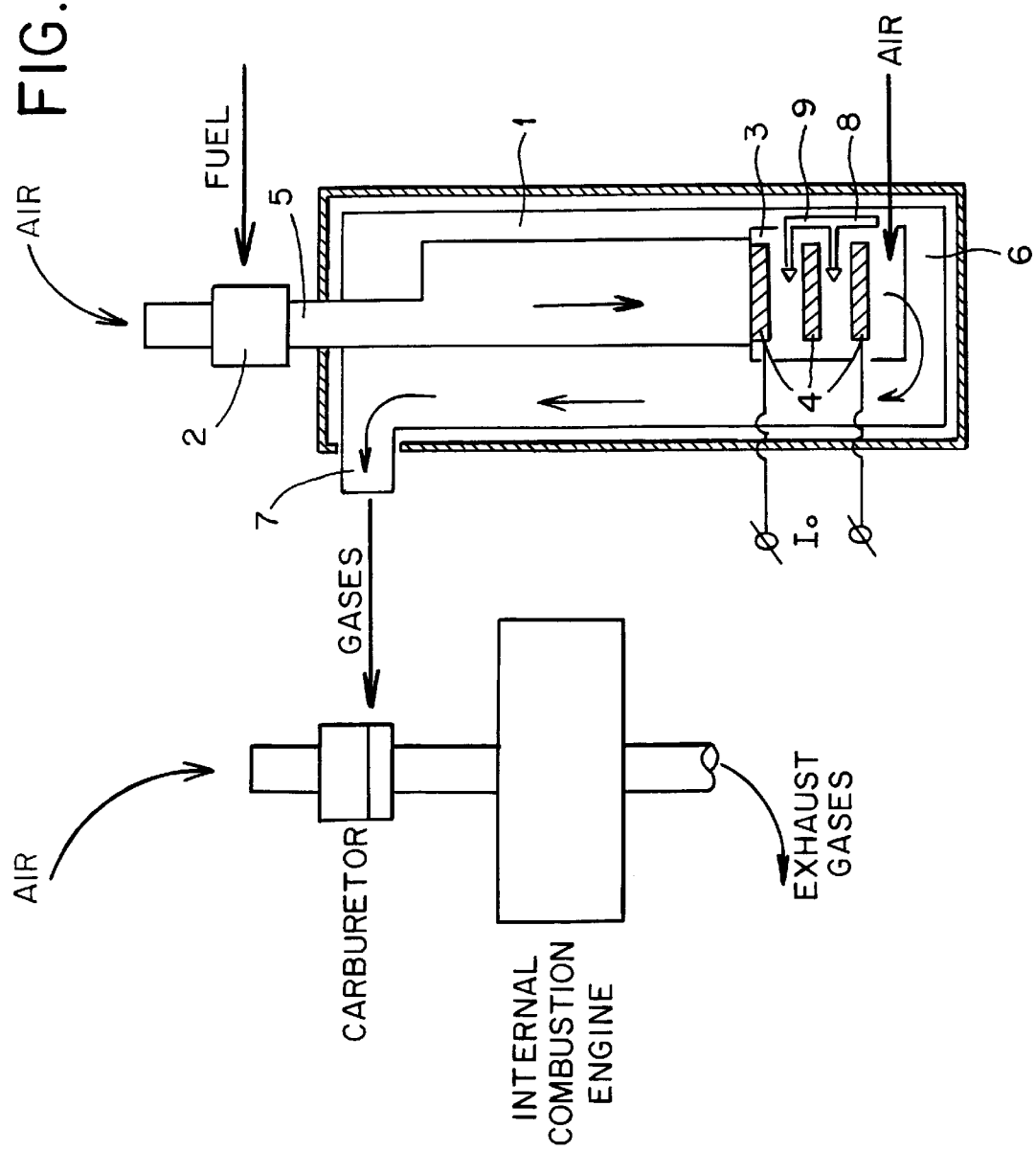
Figure 2C:
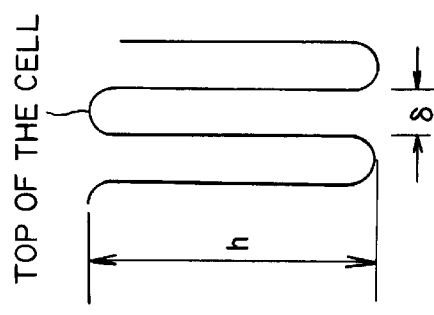
Figure 2B:
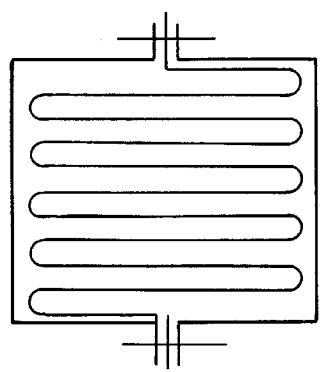
Figure 2A:
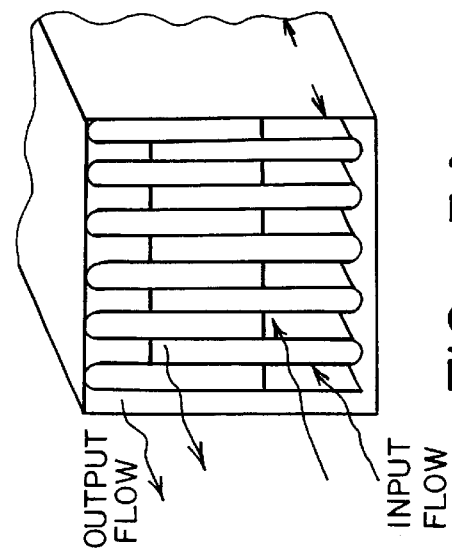

The device for carrying the proposed method into effect comprises a double-loop heat-exchanger 1, a proportioner 2 of the mixture components (fuel and air), a promoter chamber 3 accommodating a promoter 4, an inlet S for fuel-air mixture communicating the proportioner with the heat-exchanger mixture-handling loop, an inlet 6 of the of the heat-exchanger gas-handling loop connected to the outlet of the promoter chamber, an outlet 7 of the gas-handling loop through which the resultant gases are admitted to the engine, and an extra-air piping 8 provided with air nozzles 9 disposed in the promoter chamber.

With the proposed device operating, an overrich gasoline-air mixture (having an excess air coefficient below 0.45) is prepared in the proportioner 2, which mixture is fed through the inlet 5 to the mixture loop of the heat-exchanger 1 and to be exposed to thermal action with the aid of the promoter 4 in the chamber 3 thereof. Then hot oil gases obtained in the chamber 3 are passed via the inlet 6 of the gas-handling loop towards the outlet 7, thus giving up their heat to the fuel-air mixture fed by the proportioner 2 along the mixture-handling loop to the promoter chamber 3, whereby said hot gases are cooled. To compensate for the air spent for the abovesaid reactions, additional air is fed along the piping 8 to the promoter chamber, which air is fed to the mixture being handled via the nozzles 9 downstream of the promoter.

The device makes provides for a possibility for using promoters made up of a number of sections arranged in succession as along the direction of motion of the flow of mixture being handled. Such being the case, the air nozzles are provided after each promoter section.

The promoter is heated by electric current supplied through terminals 10. Promoters may have various construction arrangement and be made from any materials used for electric heating elements. The principal requirement to be met promoter construction arrangements is well developed heating surface.

The device makes no use of engine exhaust gases for heating purposes, whereby it is not constructionally linked with the engine exhaust system and can be installed in any convenient place which is of importance when the device is used in a motor vehicle.

The proposed construction arrangement of the heat-exchanger makes it possible to do away with devices causing the mixture flows to repeatedly turn through 90 degrees.

When a cell portion is compressed the width of the same portion of the adjacent cells increases. Thus, cross-sectional area S of the passage of the outlet (inlet) portion of each cells remains unaffected (FIGS. 3, A, B):

$$S = h \cdot b = (h/2) \cdot 2b,$$

where h is the height of a cell,
b is the width of a cell.

Figure 3C:
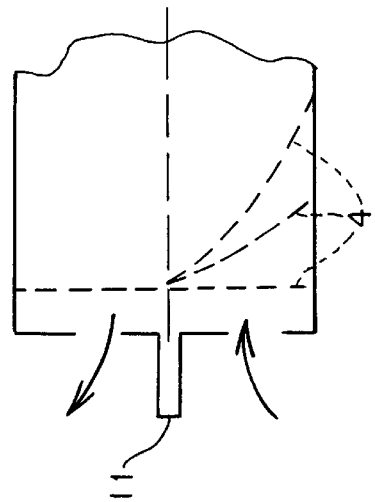
Figure 3B:
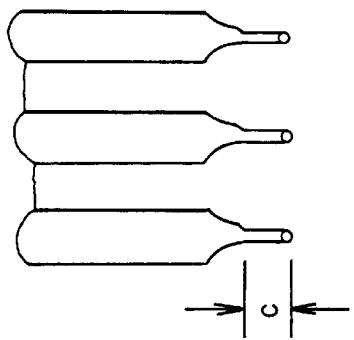
Figure 3A:
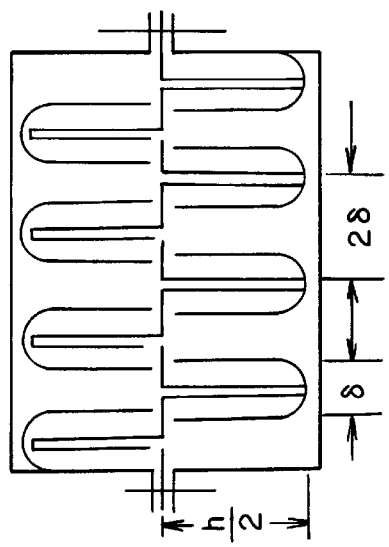

Whenever it becomes necessary and depending on the construction arrangement of the devices connected to the heat-exchanger, such as reactor or promoter chamber, the cells grouped according to their inputs/outputs may be provided with an additional flow divider 11 (FIG. 3, C). The narrower a cell-duct the better heat exchange between the flows of matter.

When the heat-exchanger communicates with a device wherein reactions of liquid fuel decomposition into oil gases occur, the volume of hot gases at the heat-exchanger outlet is much higher so that the slit-like ducts for said gases to pass can be wider (FIG. 4, B).

Thus, the width of the ducts of both flows is optimized with due account of the aerodynamic drag of each of them.

When the cells-ducts are of a small-width the heat-exchanger may have an adequately large heat-exchange surface area and may operate appropriately, with the laminarity of the flows and their low aerodynamic drag remaining unaffected.

Construction arrangement of electric input terminals in hermetically sealed chambers accommodating high-temperature electric heaters, especially under conditions of restricted overall dimensions of the entire device and whenever it is necessary to provide a "cool" wire electrode for connection to a current source which is the case with a motor vehicle.

To supply current to the high-temperature chamber, one or more heat-exchanger cells along which hot fluid flows have a reduced height 12 (FIG. 4). A space 13 thus defined over the reduced-height cell accommodates a wire running along said space throughout the heat-exchanger from the "hot" chamber towards the inlet of the "cool" fluid (e.g., fuel-air mixture). While running the "cool" flow cools the electric conductor, thus providing the outlet of the "cool" wire from the heat-exchanger.

Whenever necessary such spaces can accommodate wire conductors for the automatic control system monitors and transducers situated in the high-temperature zone, as well as pipings feeding necessary additives to the chamber.

The proposed heat-exchanger may comprise a single or more heat-exchanging elements enclosed in a common casing with heat insulation (both casings and heat insulation being not shown in the drawings).

To utilize the heat of hot oil gases generated in the reactor the latter is connected through its input and output directly to the respective heat-exchanger flow passages. The flow of the preheated fuel-air mixture running from the heat-exchanger to the reactor is therein turned through 180 degrees to pass throughout the heat-exchanger in the reverse direction (FIG. 5, A).

Enhanced aerodynamic characteristics are attained when using cocurrent reactors or promoter chambers. In this case it is practicable tandem-connection of two heat-exchanging elements or two heat-exchangers for, e.g., a multicylinder internal combustion engines (FIG. 5, B). With such a construction arrangement the flow of mixture being preheated passes through a first heat-exchanging element 14, then through a chamber 15 and, in the form of a gaseous mixture, through a second series-connected heat-exchanging element 16 without reversing its motion. A second flow of mixture is established and handled similarly to the first one but running in an opposite direction. The mixture of the first flow is heated, upstream of the promoter, by the hot gases of the second flow of mixture emerging from a chamber 17, while the mixture of the second flow is heated by the hot gases of the first flow of mixture emerging from the chamber 15.

The loss of head of the running flows can be reduced when using fuel injection devices for preparing an initial (starting) fuel-air mixture. Such devices can be installed immediately on the inlet heat-exchanger section.

What is claimed is:

1. A method for preparing fuel-air mixture for internal combustion engines, consisting in establishing two flows of the fuel-air mixture of which one gets overrich below the ignition range, preheating said overrich flow to produce carbon monoxide and hydrogen-containing gases, and mixing said flow with the other flow of mixture before feeding said flows of mixture to the engine cylinders, CHARACTERIZED in that the overrich flow of the fuel-air mixture containing 10 to 100% of the fuel consumed by the engine is subjected to single- or multi-stage thermal action by a promoter and the air spent for reactions is compensated for either partially or completely.

2. The method of claim 1, CHARACTERIZED in that the spent air is compensated for by being fed into the flow of mixture downstream of the promoter.

3. The method of claim 1, CHARACTERIZED in that the flow of overrich fuel-air mixture is preheated by the heat of the resultant hot oil gases, thereby reducing the temperature of said gases before feeding them to the engine.

4. A device for preparing fuel-air mixture for internal combustion engines, comprising a double-loop heat-exchanger having an inlet piping and an outlet piping, a mixture-handling loop, a gas-handling loop, a promoter chamber, and a proportioner of the mixture components, the inlet of the mixture-handling loop being connected to the proportioner of the mixture components and to the promoter chamber, CHARACTERIZED in that the inlet and outlet pipings of the gas-handling loop are connected to the promoter chamber and the inlet duct of the engine for fuel-air mixture, and the promoter chamber accommodates additional air feeding nozzles.

5. The device of claim 4, CHARACTERIZED in that the promoter is of the multistage design and appears as successively arranged sections, and the air nozzles are provided past each of said sections.

* * * * *